US011192471B2

(12) United States Patent
Spagnoli et al.

(10) Patent No.: US 11,192,471 B2
(45) Date of Patent: Dec. 7, 2021

(54) SLIDING DEVICE FOR A VEHICLE SEAT PROVIDED WITH AN IMPROVED LOCKING ARRANGEMENT

(71) Applicant: MARTUR ITALY S.R.L., Milan (IT)

(72) Inventors: Luigi Spagnoli, Grugliasco (IT); Can Üstünberk, Grugliasco (IT)

(73) Assignee: MARTUR ITALY S.R.L., Milan (IT)

( * ) Notice: Subject to any disclaimer, the term of this patent is extended or adjusted under 35 U.S.C. 154(b) by 0 days.

(21) Appl. No.: 17/272,440

(22) PCT Filed: Jul. 25, 2019

(86) PCT No.: PCT/IB2019/056373

§ 371 (c)(1),
(2) Date: Mar. 1, 2021

(87) PCT Pub. No.: WO2020/049377

PCT Pub. Date: Mar. 12, 2020

(65) Prior Publication Data

US 2021/0245632 A1 Aug. 12, 2021

(30) Foreign Application Priority Data

Sep. 5, 2018 (IT) ........................ 102018000008367

(51) Int. Cl.
*B60N 2/08* (2006.01)

(52) U.S. Cl.
CPC ......... *B60N 2/0806* (2013.01); *B60N 2/0818* (2013.01); *B60N 2/0875* (2013.01); *B60N 2/0887* (2013.01)

(58) Field of Classification Search
CPC .. B60N 2/0705; B60N 2/0715; B60N 2/0706; B60N 2/0812; B60N 2/0818;
(Continued)

(56) References Cited

U.S. PATENT DOCUMENTS 4,881,774 A * 11/1989 Bradley ................. B60N 2/123
297/341
5,100,092 A * 3/1992 Sovis ..................... B60N 2/071
248/429
(Continued)

FOREIGN PATENT DOCUMENTS

CN 107009919 A 8/2017
CN 207737153 U 8/2018
(Continued)

OTHER PUBLICATIONS

International Search Report and Written Opinion of the International Searching Authority dated Dec. 11, 2019 for International Patent Application No. PCT/IB2019/056373.

*Primary Examiner* — Jonathan Liu
*Assistant Examiner* — Guang H Guan
(74) *Attorney, Agent, or Firm* — Howson & Howson LLP

(57) ABSTRACT

A sliding device for a vehicle seat includes a pair of tracks, each having a lower rail and an upper rail, and a locking arrangement having a pair of locking assemblies, each including locking pins for locking a respective one of the upper rails to a respective one of the lower rails. The locking arrangement includes a releasing assembly for driving the locking pins of each of the locking assemblies to an unlocking configuration. The releasing assembly includes a releasing member and a pair of connecting members. The connecting members are each in a force transmission connection with the releasing member and with the locking pins of a respective one of the locking assemblies. The connecting members are entirely received within the tracks, and the releasing assembly is configured to convert rotational movement of the releasing member into linear movement of the locking pins of each of the locking assemblies.

10 Claims, 7 Drawing Sheets

(58) Field of Classification Search
CPC .. B60N 2/0843; B60N 2/0862; B60N 2/0875; B60N 2/0881; B60N 2/0887; B60N 2/0893
USPC ............ 248/424, 429, 430; 296/65.13–65.15
See application file for complete search history.

(56) References Cited

U.S. PATENT DOCUMENTS 5,568,908 A * 10/1996 Kisiel .................. B60N 2/0705 248/419
5,799,920 A * 9/1998 Wittkowsky ......... B60N 2/0705 248/429
6,227,596 B1 * 5/2001 Foucault ................ B60N 2/123 296/65.13
6,637,712 B1 10/2003 Lagerweij
6,869,057 B2 * 3/2005 Matsumoto .......... B60N 2/0705 248/429
7,669,825 B2 * 3/2010 Sung .................... B60N 2/0825 248/429
7,717,392 B2 * 5/2010 Sakakibara ............ B60N 2/085 248/429
7,980,525 B2 7/2011 Kostin
8,800,948 B2 * 8/2014 Wakayama .......... B60N 2/0806 248/429
9,114,735 B2 8/2015 Utzinger
9,393,883 B2 * 7/2016 Wojatzki .............. B60N 2/0887
9,409,497 B1 8/2016 Mizuno et al.
9,481,266 B2 * 11/2016 Kim ..................... B60N 2/0806
11,027,629 B2 * 6/2021 Krpo .................... B60N 2/0818
11,110,826 B2 * 9/2021 Spagnoli .............. B60N 2/0705
2003/0006355 A1 1/2003 Horsfield et al.
2009/0051208 A1 2/2009 Szybisty et al.
2020/0391619 A1 12/2020 Krpo et al.
2020/0391620 A1 12/2020 Krpo et al.
2020/0398704 A1 12/2020 Krpo et al.
2020/0406785 A1 12/2020 Krpo et al.
2021/0046851 A1 2/2021 Spagnoli et al.
2021/0053469 A1 2/2021 Spagnoli et al.
2021/0245632 A1 * 8/2021 Spagnoli .............. B60N 2/0806

FOREIGN PATENT DOCUMENTS

DE 19526317 A1 * 1/1997 ........... B60N 2/0715
DE 102011017378 B3 4/2012
JP 2000-142190 A 5/2000

* cited by examiner

SLIDING DEVICE FOR A VEHICLE SEAT PROVIDED WITH AN IMPROVED LOCKING ARRANGEMENT

TECHNICAL FIELD

The present invention relates to a sliding device for a vehicle seat provided with an improved locking arrangement.

More particularly, the present invention relates to a sliding device for a vehicle seat provided with a locking arrangement having a compact construction and an improved reliability.

BACKGROUND ART

Vehicle seats generally have a sliding function for pushing or pulling the seat cushion in a forward or backward direction, a height adjustment function for adjusting the height of the seat cushion, and a reclining function for adjusting the inclination of the seat backrest relative to the seat cushion.

The aforesaid sliding function is generally implemented by a sliding device which comprises a pair of parallel tracks, each of which comprises a lower rail attached to the vehicle floor and an upper rail attached to the vehicle seat, the upper rail being constrained to the lower rail, but being able to slide relative to said lower rail.

The sliding device further comprises a locking arrangement for allowing/preventing a movement of the upper rails relative to the lower rails. Such locking arrangement is normally in a locking configuration, in which it prevents the upper rails from sliding with respect to the lower rails, thus avoiding accidental displacements of the seat with respect to the vehicle floor.

Such locking arrangement normally comprises a pair of locking assemblies, one for each track.

The sliding device is further provided with a releasing member which can be used by a user for moving the locking assemblies of the locking arrangement to an unlocking configuration, in which the upper rails are free to move relative to the lower rails, so that the position of the seat with respect to the vehicle floor can be adjusted. Such releasing member can be made, for instance, as a "U"-shaped handle or towel bar having two substantially parallel arms, the end portions of which are configured to simultaneously act upon respective locking assemblies for driving them to their unlocking configuration.

Sliding devices are known from the art in which, in order to provide a positive engagement between the upper and lower rails, the lower rail of each track is provided with a series of apertures, aligned and preferably equally spaced from one another along the longitudinal axis of said lower rail, and each locking assembly is connected to the respective upper rail and comprises one or more locking pins configured to penetrate into respective apertures of the lower rail and engage with the edge of said apertures.

Preferably, several locking pins are provided and the size of said locking pins, the distance between said locking pins, the size of the apertures in the lower rails and the distance between said apertures are chosen so that at least one locking pin is always aligned with a corresponding aperture, so that it can penetrate into said aperture and engage the edge thereof.

Most preferably, the size of said locking pins, the distance between said locking pins, the size of the apertures in the lower rails and the distance between said apertures are chosen so that at least a first locking pin is positioned so as to penetrate into a corresponding aperture and engage the forward side of the edge thereof and at least a second locking pin is positioned so as to penetrate into a corresponding aperture and engage the rearward side of the edge thereof, whereby a "chuckless" engagement is obtained.

Such locking pins are normally biased, e.g. by means of springs, to a locking configuration, in which at least some of them engage respective apertures of the lower rails.

In order to move the locking assemblies to their unlocking configuration for adjusting the position of the vehicle seat with respect to the vehicle floor, a releasing member—such as a releasing towel bar or handle—is provided, which acts upon respective connecting members, one for each locking assembly: said connecting members, in turn, act upon the locking pins of the respective locking assembly for moving them to an unlocking configuration, in which they are disengaged from the apertures of the respective lower rail.

To this purpose, the locking pins are generally provided with an enlarged head and the connecting members are provided with fork-shaped elements adapted to engage the pin heads for extracting said pins from the apertures of the lower rails.

Such locking arrangements for a sliding device for vehicle seats are disclosed, for instance, in documents US 2003/006355, U.S. Pat. Nos. 7,980,525 and 6,637,712.

However, a locking arrangement of the kind disclosed in the aforesaid documents has several drawbacks.

First of all, in the known locking arrangements the connecting members connecting the releasing member to the locking assemblies are either partially or completely arranged outside the tracks of the sliding device.

This entails the need for providing enough room for receiving said connecting members when designing the sliding device.

Moreover, as they are at least partially arranged outside the tracks of the sliding device, such connecting members are exposed to dust and dirt, which may accumulate between the moving parts of these connecting members and cause malfunctioning thereof. Such dust and dirt may also penetrate into the tracks of the sliding device and interfere with the movement of the locking pins from their locking configuration to their unlocking configuration, and vice versa. Usual malfunctioning issues include increased release efforts, increased sliding efforts and noise issues, which may trigger users' dissatisfaction.

Secondly, in the known locking arrangements the releasing member is designed for making the connecting members rotate about a pivoting axis in order to move the locking pins from the locking configuration to the unlocking configuration: upon rotation of the connecting members, the fork-shaped elements of said connecting members move upwardly along an arc-shaped path, thus engaging the heads of the locking pins and lifting said locking pins so as to disengage them from the apertures of the corresponding lower rail. As the fork-shaped elements of the connecting members move along an arc-shaped path, the locking pins will move along an arc-shaped path as well, which can entail remarkable problems.

As a result, during their movement the locking pins may get stuck against the edge of the respective apertures of the lower rails, thus causing jamming of the respective locking assembly.

Moreover, due to the movement along an arc-shaped path, the length of the stroke of the locking pins is limited, which allows little margin for guaranteeing that the locking pins correctly move out of the apertures of the lower rails when actuated by the connecting members of the release assembly.

Furthermore, when designing the locking arrangement, enough room has to be provided for the rotational movement of the connecting members and of the locking pins.

Therefore, a main object of the present invention is to provide a sliding device for a vehicle seat which allows to overcome the aforementioned drawbacks.

More particularly, a main object of the present invention is to provide a sliding device for a vehicle seat provided with an improved locking arrangement having a compact structure and showing high reliability.

This and other objects are achieved by a sliding device as claimed in the appended claims.

SUMMARY OF INVENTION

The invention relates to sliding device for a vehicle seat which comprises a pair of parallel tracks, each including a lower rail, intended to be attached to the vehicle floor, and an upper rail, intended to be attached to the vehicle seat and slidably mounted to said lower rail, each lower rail comprising a plurality of apertures, aligned and equally spaced from one another along the longitudinal axis of said lower rail.

The sliding device further comprises a locking arrangement which comprises a locking assembly associated to each track for selectively allowing/preventing a movement of said upper rails relative to said lower rails. Each locking assembly is connected to a respective upper rail and comprises one or more locking pins configured to penetrate into corresponding apertures of the respective lower rail and to engage the edges of said apertures, said locking pins being biased to a locking configuration, for instance by spring means.

According to a preferred embodiment of the invention, each locking assembly comprises a plurality of locking pins. According to a particularly preferred embodiment of the invention, such locking pins are sized and arranged so that, for any position of the upper rail relative to the lower rail, at least one locking pin is aligned with a corresponding aperture of the respective lower rail and can penetrate into said aperture and engage the edge thereof.

The locking arrangement is further provided with a releasing assembly for simultaneously switching said locking assemblies from a locking configuration, in which the movement of the upper rails of the tracks relative to the respective lower rails is prevented, to an unlocking configuration, in which the movement of said upper rails relative to the respective lower rails is allowed.

Said releasing assembly comprises a releasing member and a pair of connecting members, one for each locking assembly, each of said connecting members being in a force transmission connection with the releasing member, on one hand, and with the locking pins of the respective locking assembly, on the other hand.

Accordingly, when a user applies a force to the releasing member, such force is transmitted from the releasing member to the connecting members, and from said connecting members to the locking pins of the respective locking assembly, thus driving said locking pins from their locking configuration to their unlocking configuration.

According to the invention, such connecting members are entirely received within the respective tracks, and the releasing assembly is configured to convert a rotational movement of the releasing member into a linear movement of the locking pins of the locking assemblies.

This arrangement allows to obtain a compact structure, which turns out to be advantageous in packaging the sliding device with respect to the external release systems proposed in the prior solutions, in which the connecting members of the releasing assembly are arranged at least partially outside the respective tracks.

Moreover, thanks to the substantially translational movement of the locking pins, the risk that the locking pins get stuck against the edge of the apertures of the lower rails is avoided, thus avoiding the risk of jamming of the locking assemblies.

In addition, the length of the stroke of the locking pins can be increased with respect to traditional locking arrangements, thus ensuring a correct disengagement of the locking pins from the apertures of the lower rails.

According to a preferred embodiment of the present invention, the releasing member is made as a "U"-shaped handle having a middle, gripping portion and two substantially parallel arms, each penetrating into a respective track.

According to this preferred embodiment, each arm of the releasing handle is provided with a transversely protruding pin which is received in a kidney-shaped slot, so that a rotational movement of the gripping portion of the releasing handle is converted into a translational movement of the end portions of the arms of said releasing handle, namely in a vertically oriented translational movement of the end portions of said arms of said releasing handle.

According to this preferred embodiment, each connecting member comprises a coupling portion for coupling with the end portion of a respective arm of the releasing handle, and an engaging portion for engaging the locking pins of a respective locking assembly.

According to a particularly preferred embodiment, each locking assembly comprises a support plate, which is fastened to the upper rail of the respective track and through which the locking pins are arranged to pass, and the engaging portion of each connecting member is shaped as a plate through which the locking pins are arranged to pass, the plate-shaped engaging portion of each connecting member being connected to the support plate of the corresponding locking assembly by means of a four-bar linkage, preferably by means of a parallelogram linkage.

According to a preferred embodiment of the invention, the locking pins are provided with transversely projecting pegs and the plate-shaped engaging portion of the connecting member comprises a window having a width larger than the width (diameter) of the locking pins but smaller than the sum of the width of the locking pins and the length of the projecting pegs, so that the edge of the window of the driving portion of the spring plate can engage such pegs for driving the locking pins to their unlocking configuration.

According to an alternative preferred embodiment of the invention, the transversely projecting pegs are replaced by an outwardly extending radial collar provided on the body of the locking pins.

BRIEF DESCRIPTION OF DRAWINGS

Further features and advantages of the invention will become more evident from the detailed description of a preferred embodiment thereof, given by way of non limiting example, with reference to the attached drawing, in which.

DESCRIPTION OF EMBODIMENTS

Figure 1:
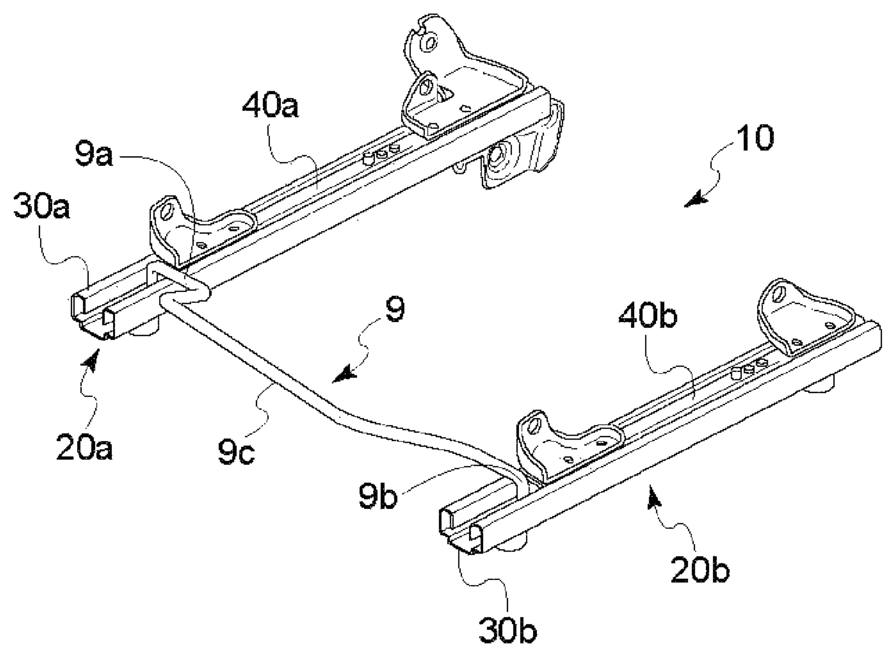
FIG. 1 is a perspective view of a sliding device according to the invention.

With reference to FIG. 1, a sliding device 10 according to the invention is shown.

In a per se known manner, the sliding device 10 comprises a pair of parallel tracks 20*a*, 20*b*, each comprising a lower rail 30*a*, 30*b*, intended to be attached to the vehicle floor, and an upper rail 40*a*, 40*b*, intended to be attached to the frame of a vehicle seat.

Each upper rail 40*a*, 40*b* is constrained to the respective lower rail 30*a*, 30*b*, but can slide relative to said lower rail.

In order to selectively allow/prevent a sliding movement of the upper rails relative to the lower rails of the tracks 20*a*, 20*b*, a locking arrangement is provided. Said locking arrangement comprises two locking assemblies, one for each track 20*a*, 20*b*.

Figure 4A:
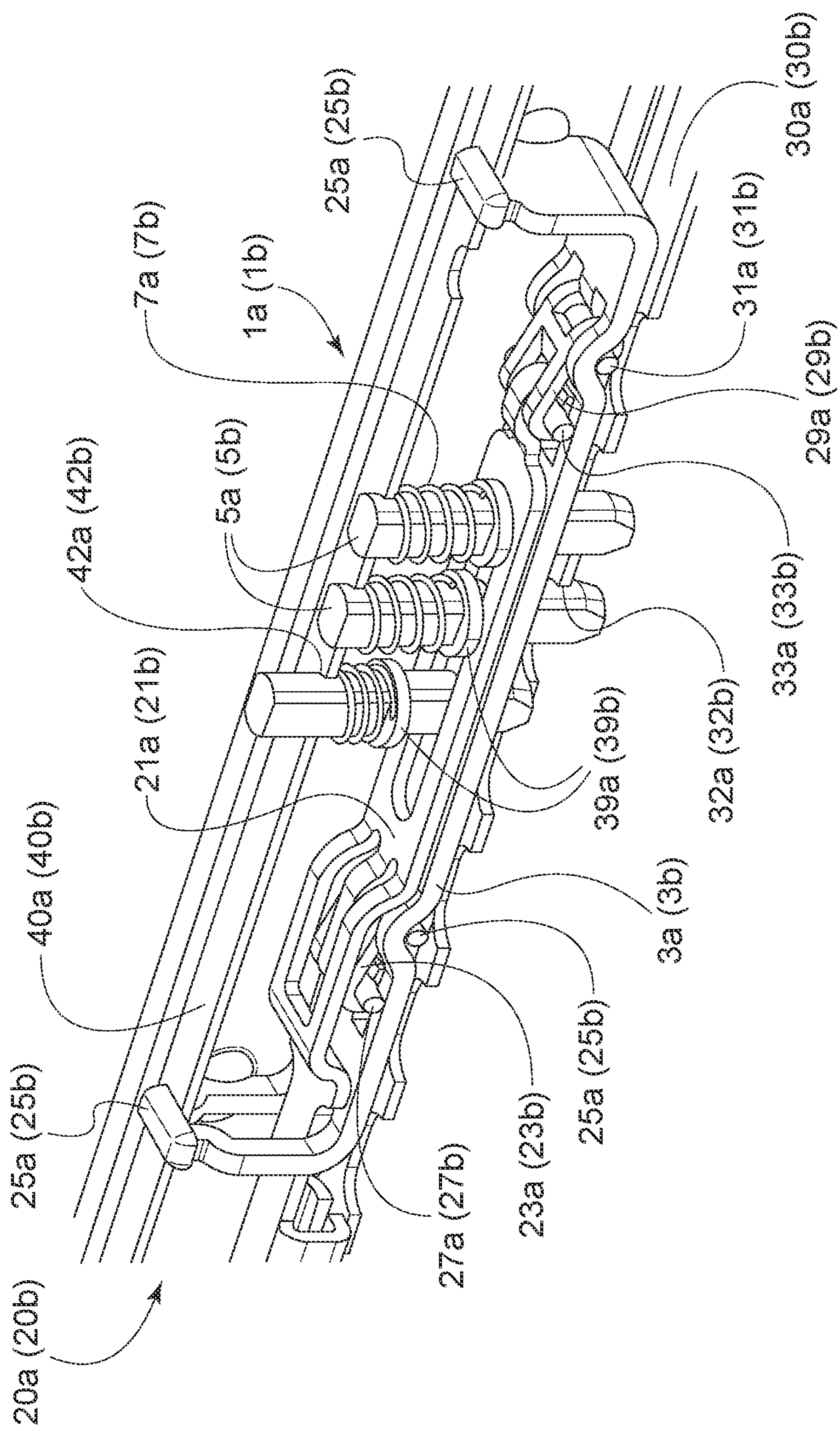
FIG. 4*a* is a perspective, cutaway view of a connecting member of the sliding device of FIG. 1, shown in a first, locking configuration.
Figure 4B:
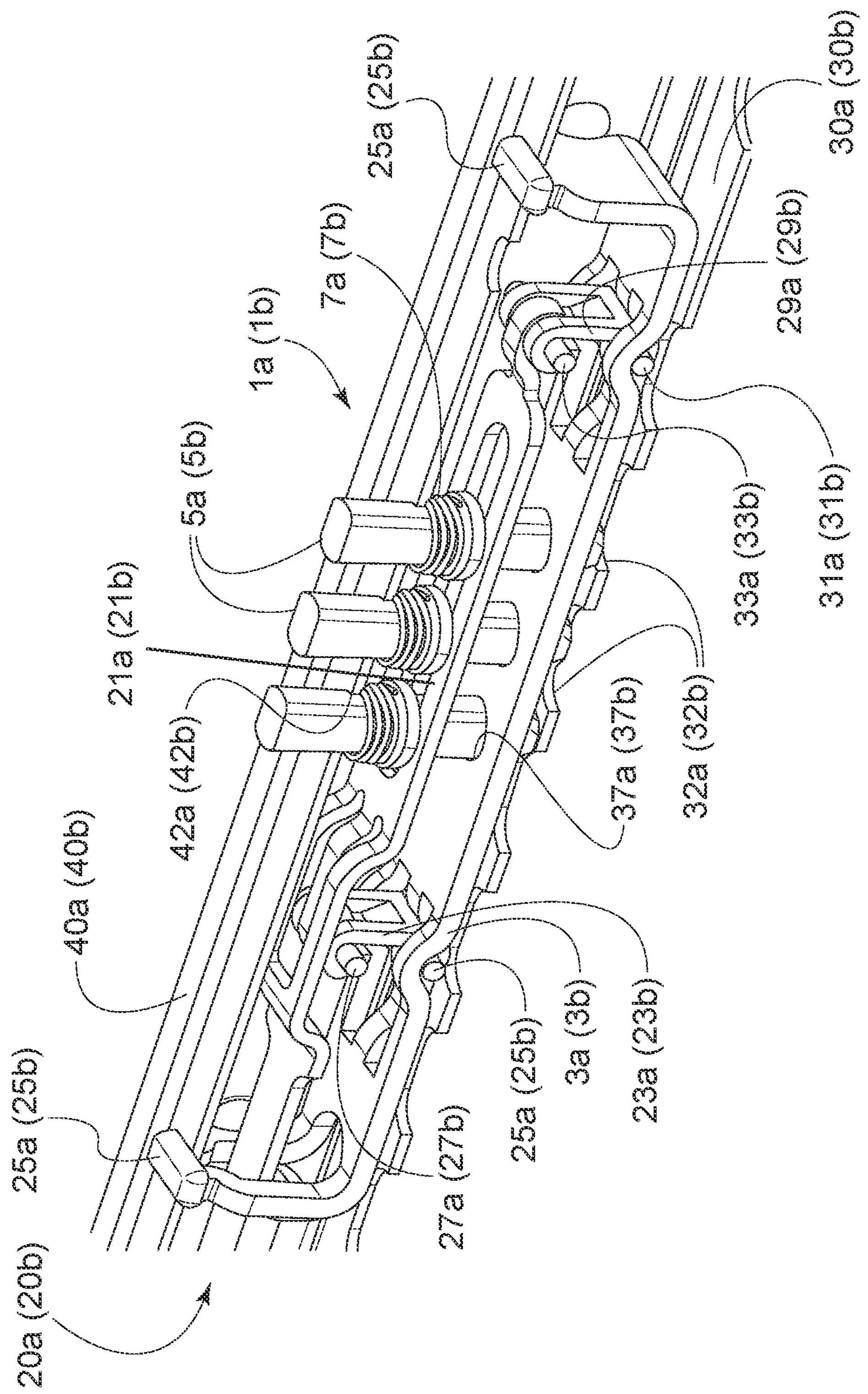
FIG. 4*b* shows the connecting member of FIG. 4*a* in a second, unlocking configuration.

One of said locking assemblies can be seen in detail, for instance, in FIGS. 4*a*-4*b*. It is to be intended that the other locking assembly is identical to the one shown in FIGS. 4*a*-4*b*.

Each locking assembly 1*a*, 1*b* comprises a support plate 3*a*, 3*b*, which is fastened to the respective upper rail 40*a*, 40*b*.

The support plate may be, for instance, welded and/or staked to the respective upper rail 40*a*, 40*b*. However, in the shown embodiment, the support plates 3*a*, 3*b* are advantageously fastened to the respective upper rail by orbital riveting. For this purpose, the central portion of the support plate is substantially parallel to the lower and upper rails, while the side portions of said support plate are bent so as to extend perpendicularly to the lower and upper rails and end with an orbital rivet 25*a*, 25*b* engaging the upper rail 40*a*, 40*b*.

Since the support plates 3*a*, 3*b* are fastened to the respective upper rail by orbital riveting, no welding is required and the components of the sliding device are not subjected to any hot working process which could cause damages or deformations.

Each locking assembly 1*a*, 1*b*, further comprises one or more locking pins 5*a*, 5*b* (three in the shown embodiment), which are configured to pass through apertures 42*a*, 42*b* provided in the respective upper rail 40*a*, 40*b* and through through-holes 37*a*, 37*b* provided in the support plate 3*a*, 3*b* and penetrate into apertures 32*a*, 32*b* provided in the respective lower rail 30*a*, 30*b* for locking the upper rails to the lower rails and preventing any movements of said upper rails relative to said lower rails.

The locking pins 5*a*, 5*b* have a substantially cylindrical body ending with a conical or frusto-conical tip for facilitating their insertion into said apertures of the lower rails.

The locking pins 5*a*, 5*b* are biased to their locking configuration, in which at least some of them penetrate into corresponding apertures of the respective lower rail. To this purpose, a helical spring 7*a*, 7*b* is wound around the body of each locking pin 5*a*, 5*b* and biases such locking pin downwards, towards the lower rail.

In a per se known manner, the locking pins 5*a*, 5*b* and the corresponding apertures 32*a*, 32*b* provided in the lower rail are sized and arranged so that, at any position of the upper rails relative to the lower rails, at least one of said locking pins—and preferably two of them—is aligned with a corresponding aperture of the respective lower rail and penetrates therethrough.

In order to allow a user to adjust the position of the seat relative to the vehicle floor, the locking arrangement of the sliding device according to the invention also comprises a releasing assembly for moving the locking pins 5*a*, 5*b* from the aforesaid locking configuration to an unlocking configuration, in which all the locking pins are extracted from the apertures of the respective lower rail, thus allowing the upper rails to slide relative to the lower rails.

As shown in FIGS. 2*a*, 2*b* and 3*a*, 3*b*, the releasing assembly generally comprises a releasing member 9 and a pair of connecting members 17*a*, 17*b*, one for each locking assembly 1*a*, 1*b*, each connecting member being in a force transmission connection with the releasing member 9, on one hand, and with the locking pins 5*a*, 5*b* of the respective locking assembly, on the other hand.

According to the invention, the releasing assembly is configured so that a rotational movement of the releasing member is converted into a vertically oriented, translational movement of the locking pins.

In the shown embodiment, the releasing member is made as a "U"-shaped releasing handle or towel bar 9 comprising a middle gripping portion 9*c* and two substantially parallel arms 9*a*, 9*b*, each penetrating into a respective track 20*a*, 20*b*.

Each arm 9*a*, 9*b* of the releasing handle is provided with a transversely protruding pin 11*a*, 11*b* which is received in a kidney-shaped slot 13*a*, 13*b* arranged in a bracket 15*a*, 15*b* fastened to the respective upper rail 40*a*, 40*b*.

Thanks to the engagement of said pin 11*a*, 11*b* with said kidney-shaped slot 13*a*, 13*b*, when the user acts upon the gripping portion 9*c* of the releasing handle, the rotational movement of said gripping portion 9*c* is converted into a translational movement of the end portions of the arms 9*a*, 9*b* of said releasing handle, namely into a vertical, upwardly oriented translational movement of said end portions of the arms 9*a*, 9*b* of said releasing handle, In the shown embodiment, each connecting member 17*a*, 17*b* comprises a coupling portion 19*a*, 19*b* for coupling with the end portion of the respective arm 9*a*, 9*b* of the releasing handle. In the shown embodiment, the coupling portion 19*a*, 19*b* of the connecting member is made as a hollow portion, into which the end portion of the corresponding arm of the releasing handle is fitted.

Each connecting member 17*a*, 17*b* further comprises an engaging portion 21*a*, 21*b* for engaging the locking pins 5*a*, 5*b* of the respective locking assembly 1*a*, 1*b* and driving them from the locking position to the unlocking position.

In the shown embodiment, the engaging portion is made as an engaging plate 21*a*, 21*b* which is arranged above the support plate 3*a*, 3*b* of the locking assembly.

Preferably, the engaging plate substantially extends from the rear end of said support plate and projects beyond the front end of said support plate, which is correspondingly provided with a channel for the passage of said engaging plate.

The engaging plate 21*a*, 21*b* is provided with a window, through which the locking pins 5*a*, 5*b* pass so that they can reach the apertures 32*a*, 32*b* of the lower rail 30*a*, 30*b*.

The engaging plate 21*a*, 21*b* is connected to the underlying support plate 3*a*, 3*b* by means of a four-bar linkage. More particularly, the engaging plate 21*a*, 21*b* is preferably connected to the underlying support plate 3*a*, 3*b* by means of a parallelogram linkage.

Such parallelogram linkage comprises a first joint 23*a*, 23*b*, which is pivotally connected to said support plate at a first end by means of a first pivot pin 25*a*, 25*b* and is pivotally connected to said engaging plate at a second, opposite end by means of a second pivot pin 27*a*, 27*b*, and further comprises a second joint 29*a*, 29*b*, which is pivotally connected to said support plate at a first end by means of a third pivot pin 31*a*, 31*b* and is pivotally connected to said engaging plate at a second, opposite end by means of a fourth pivot pin 33*a*, 33*b*. The first and second joints 23*a*, 23*b* and 29*a*, 29*b* substantially have the same length and the distance between the connecting points of said first and second joints on the support plate 3*a*, 3*b* is substantially the same as the distance between the connecting points of said first and second joints on the engaging plate 21*a*, 21*b*, so that a parallelogram is formed.

As better visible in FIGS. 4*a* and 4*b*, for allowing the locking pins 5*a*, 5*b* to be driven by the engaging plate 21*a*, 21*b*, such locking pins are provided with an outwardly extending radial collar 39*a*, 39*b*.

The window in the engaging plate 21*a*, 21*b* is designed so that its width is larger than the width (diameter) of the locking pins 5*a*, 5*b*, but smaller than the sum of the width of said locking pins and of the width of the radial collars 39*a*, 39*b*.

Said radial collars 39*a*, 39*b* are arranged on the body of the locking pins 5*a*, 5*b* so that they are substantially in abutment against the engaging plate 21*a*, 21*b* when the locking pins are completely inserted into the apertures 32*a*, 32*b* of the lower rails 30*a*, 30*b* (locking configuration).

In an alternative embodiment, the radial collars may be replaced by one or more pegs transversely extending from the body of the locking pins.

The operation of the locking arrangement of the sliding device according to the invention can be summarized as follows.

Figure 2A:
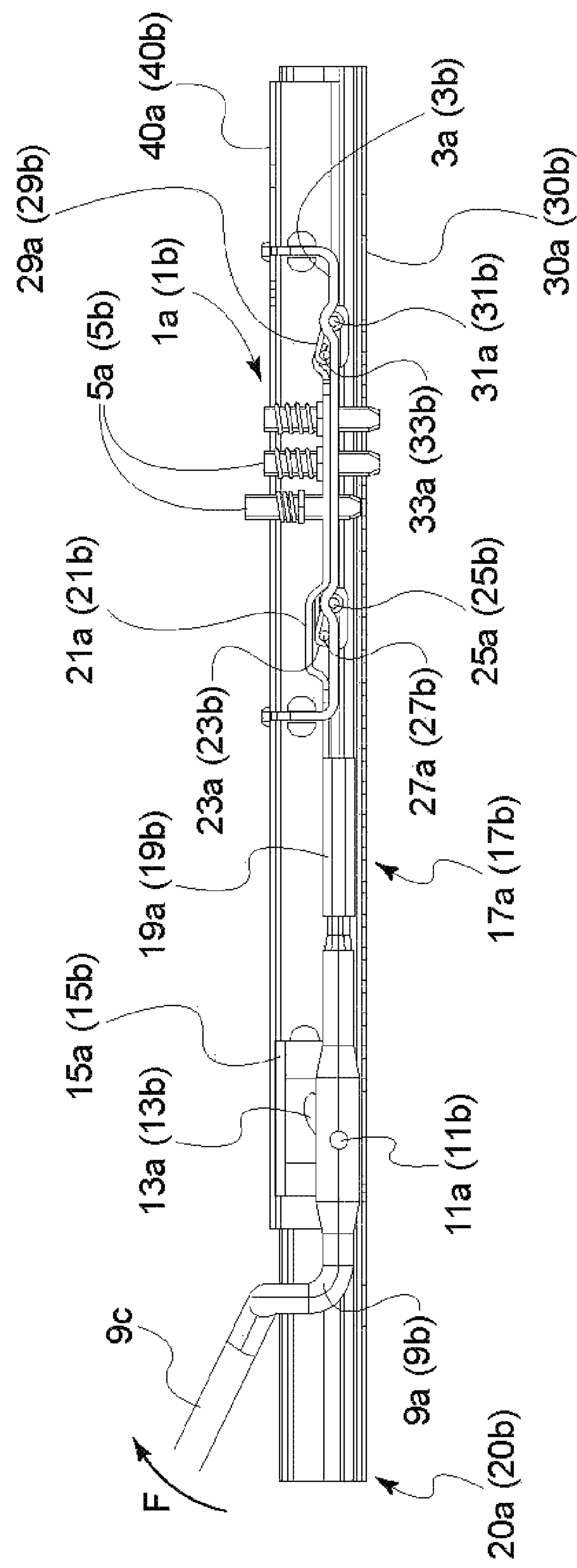
FIG. 2*a* is a cross-sectional view of the sliding device of FIG. 1 taken along the line II-II, shown in a first, locking configuration.
Figure 3A:
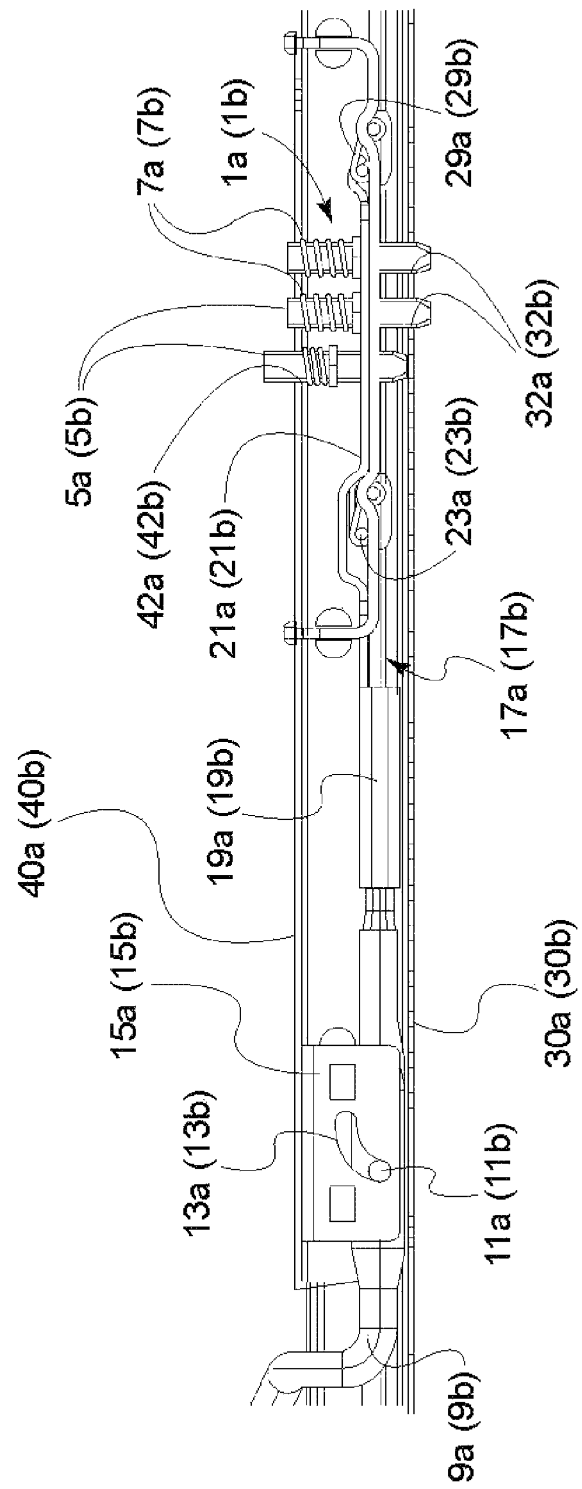
FIG. 3*a* is a cross-sectional view of the sliding device of FIG. 1 taken along the line II-II from an opposite point of view, shown in a first, locking configuration.

In a rest condition, the springs 7*a*, 7*b* bias the locking pins 5*a*, 5*b* of the locking assemblies 1*a*, 1*b* towards the apertures 32*a*, 32*b* of the lower rails 30*a*, 30*b* and at least some of said locking pins penetrate into corresponding apertures of the respective lower rail (see FIGS. 2*a*, 3*a*, 4*a*). In such a locking configuration, the upper rails 40*a*, 40*b* cannot slide relative to the lower rails 30*a*, 30*b*.

When a user wishes to adjust the position of the vehicle seat relative to the vehicle floor, he/she applies a force to the releasing handle 9, by rotating the middle gripping portion 9*c* of said handle upwards.

As the gripping portion 9*c* is rotated, the pins 11*a*, 11*b* of the arms 9*a*, 9*b* of the releasing handle slide along the respective kidney-shaped slots 13*a*, 13*b* and motion is transferred from the end portions of said arms of said releasing handle to the connecting members 17*a*, 17*b* through the coupling portions 19*a*, 19*b* of said connecting members.

As a result, the engaging portions (engaging plates) 21*a*, 21*b* of the connecting members move upwards and the edges of the windows of said engaging portions 21*a*, 21*b* engage the radial collars 39*a*, 39*b* of the locking pins 5*a*, 5*b* of the respective locking assembly.

Figure 2B:
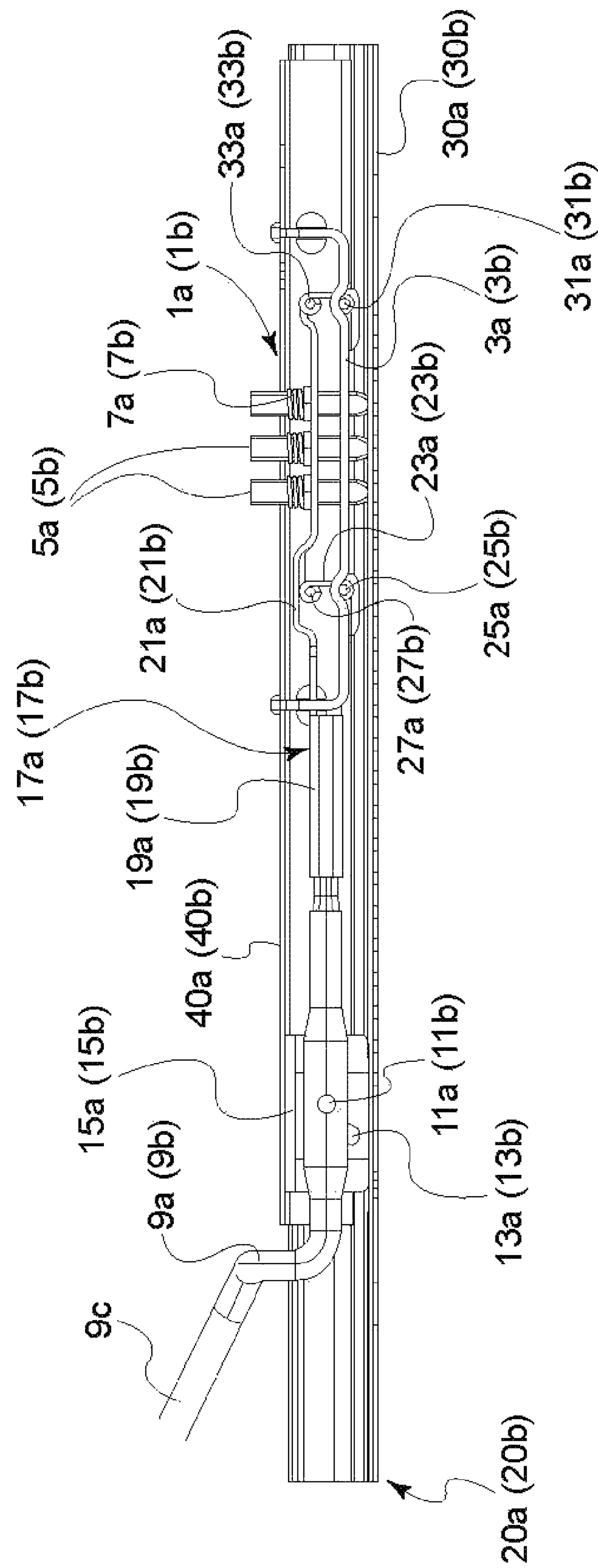
FIG. 2*b* shows the sliding device of FIG. 2*a* in a second, unlocking configuration.
Figure 3B:
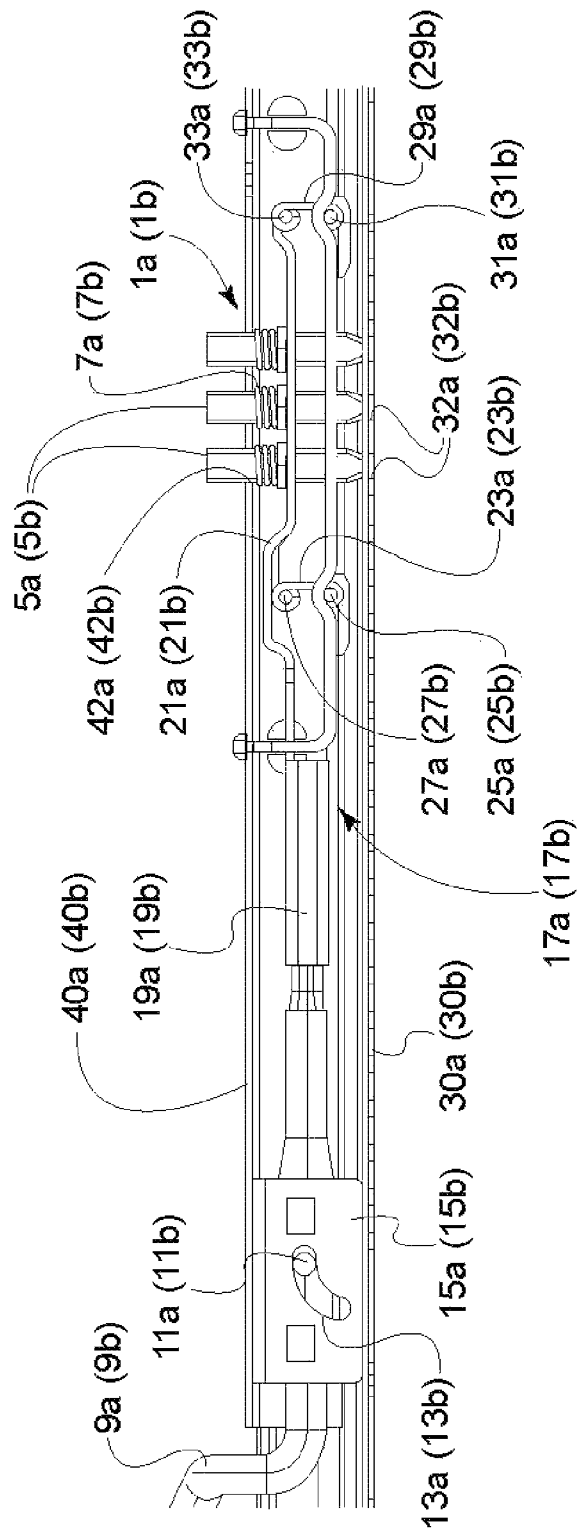
FIG. 3*b* shows the sliding device of FIG. 3*a* in a second, unlocking configuration.

By overcoming the elastic resistance of the springs 7*a*, 7*b*, the engaging portions 21*a*, 21*b* of the connecting members lift the locking pins 5*a*, 5*b*, so that they move upwards (guided by the apertures 42*a*,42*b* of the respective upper rail) until they become disengaged from the apertures 32*a*, 32*b* of the respective lower rail 30*a*, 30*b* (see FIGS. 2*b*, 3*b*, 4*b*). In such an unlocking configuration, the upper rails 40*a*, 40*b* can slide relative to the lower rails 30*a*, 30*b* and the position of the vehicle seat can be adjusted.

It is to be noted that thanks to the provision of a four-bar linkage (parallelogram linkage) between the engaging portions 21*a*, 21*b* of the connecting members and the respective support plates 3*a*, 3*b*, the stroke of the locking pins is guaranteed and is independent from the stiffness of the connecting members, namely of the engaging portions of the connecting members.

When the user releases the releasing handle 9, the springs 7*a*, 7*b* bias the locking pins 5*a*, 5*b* back towards the respective lower rail 30*a*, 30*b*, and at least some of said locking pins penetrate into corresponding apertures of said lower rail, thus locking the upper rail relative to the lower rail in a new, desired position.

The several advantages of the sliding device according to the invention will be evident to the person skilled in the art:

the connecting members connecting the releasing member to the locking assemblies are completely arranged inside the tracks of the sliding device, between the upper and lower rails, which results in an extremely compact design;

as the connecting members are completely arranged inside the tracks of the sliding device, they are not exposed to dust and dirt;

since the locking pins move along a substantially linear path when switching from their locking to their unlocking configuration, and vice versa, the risk of jamming is avoided;

the movement of the locking pins along a substantially linear path contributes to obtain a very compact design;

when using a four-bar linkage, the stroke of the locking pins is guaranteed and independent from the stiffness of the connecting members.

The above description of a preferred embodiment of the invention has been given merely by way of example and several variants and modifications within the reach of the person skilled in the art can be envisaged, without departing from the scope of the invention as defined by the appended claims.

The invention claimed is:

1. A sliding device for a vehicle seat, the sliding device comprising a pair of parallel tracks, each of the tracks comprising a lower rail and an upper rail, each of the upper rails being constrained to a respective one of the lower rails, but slidable relative to the respective one of the lower rails, wherein each of the lower rails is provided with a longitudinal axis and a plurality of apertures arranged along the longitudinal axis, wherein the sliding device is provided with a locking arrangement including two locking assemblies, each of the locking assemblies being provided for a respective one of the tracks, wherein each of the locking assemblies comprises a support plate and one or more locking pins, wherein the support plate of each of the locking assemblies is fastened to a respective one of the upper rails, wherein the one or more locking pins of each of the locking assemblies are configured to pass through a respective one of the support plates and penetrate into one or more apertures of the plurality of apertures of a respective one of the lower rails, wherein the locking arrangement further comprises a releasing assembly for moving the one or more locking pins of each of the locking assemblies from a locking configuration to an unlocking configuration, wherein the releasing assembly comprises a releasing member and a pair of connecting members, each of the connecting members being provided for a respective one of the locking assemblies, each of the connecting members being in a force transmission connection with the releasing member and with the one or more locking pins of the respective one of the locking assemblies, wherein the releasing assembly is configured to convert a rotational movement of the releasing member into a translational movement of the one or more locking pins of each of the locking assemblies, wherein the releasing member is made as a U-shaped releasing handle comprising a middle gripping portion and two substantially parallel arms, each of the arms penetrating into a respective one of the tracks, wherein the releasing handle engages two brackets, each of the brackets including a kidney-shaped slot and being fastened to a respective one of the upper rails, and wherein each of the arms of the releasing handle is provided with a transversely protruding pin received in the kidney-shaped slot of a respective one of the brackets.

2. The sliding device according to claim 1, wherein each of the connecting members is entirely received within a respective one of the tracks, each of the connecting members being arranged between the upper rail of the respective one of the tracks and the lower rail of the respective one of the tracks.

3. The sliding device according to claim 1, wherein each of the arms of the releasing handle has an end portion, wherein each of the connecting members comprises a coupling portion for coupling with the end portion of a respective one of the arms of the releasing handle, and wherein each of the connecting members further comprises an engaging portion for engaging the one or more locking pins of the respective one of the locking assemblies.

4. The sliding device according to claim 3, wherein the engaging portion of each of the connecting members is made as an engaging plate arranged above a respective one of the support plates.

5. The sliding device according to claim 4, wherein each of the tracks includes a first joint and a second joint, wherein each of the engaging plates is connected to the respective one of the support plates by a respective one of the first joints and a respective one of the second joints, thereby forming a parallelogram linkage within a respective one of the tracks.

6. The sliding device according to claim 5, wherein each of the first joints has a first end and a second, opposite end, each of the first joints being pivotally connected to a respective one of the support plates at the first end of the first joint by a first pivot pin and being pivotally connected to a respective one of the engaging plates at the second, opposite end of the first joint by a second pivot pin, and wherein each of the second joints has a first end and a second, opposite end, each of the second joints being pivotally connected to a respective one of the support plates at the first end of the second joint by a third pivot pin and being pivotally connected to a respective one of the engaging plates at the second, opposite end of the second joint by a fourth pivot pin.

7. The sliding device according to claim 4, wherein each of the engaging plates is provided with a window, wherein the one or more locking pins of each of the locking assemblies pass through the window of a respective one of the engaging plates, and wherein each of the one or more locking pins of each of the locking assemblies is provided with a body and an outwardly extending radial collar, a width of the window of each of the engaging plates being larger than a width of the body of each of the one or more locking pins of a respective one of the locking assemblies, but smaller than a sum of the width of the body of any one of the one or more locking pins of the respective one of the locking assemblies and a width of the radial collars the radial collar of the any one of the one or more locking pins of the respective one of the locking assemblies.

8. The sliding device according to claim 7, wherein each of the radial collars is arranged on the body of a respective one of the one of the one or more locking pins of a respective one of the locking assemblies, so that each of the radial collars is substantially in abutment against a respective one of the engaging plates when the one or more locking pins of the respective one of the locking assemblies are completely inserted in the one or more apertures of the plurality of apertures of the respective one of the lower rails.

9. The sliding device according to claim 1, wherein each of the support plates is connected to the respective one of the upper rails by orbital riveting.

10. The sliding device according to claim 1, wherein each of the one or more locking pins of each of the locking assemblies is biased towards a respective one of the one or more apertures of the plurality of apertures of the respective one of the lower rails by a spring.

* * * * *